May 7, 1929. E. E. CLARK 1,711,772

DRY PIPE VALVE

Filed April 19, 1924

Inventor.
Ezra E. Clark
by Heard Smith & Tennant.
Attys.

Patented May 7, 1929.

1,711,772

UNITED STATES PATENT OFFICE.

EZRA E. CLARK, OF NEWTONVILLE, MASSACHUSETTS, ASSIGNOR TO FRANK J. FEE, OF NEW ROCHELLE, NEW YORK.

DRY-PIPE VALVE.

Application filed April 19, 1924. Serial No. 707,743.

This invention relates to dry pipe valves and particularly to the pivotal connection between the air valve and the casing. In some dry pipe valves, such for instance as illustrated in my Patent No. 1,450,428, April 3rd, 1923, the water valve and air valve are pivotally connected together and the water valve has an arm provided with a pivotal pin or shaft which is journalled in a slotted bearing formed on the casing, the slot of the bearing being for the purpose of permitting the pivotal shaft to be readily removed from the bearing whenever it is desired to remove the combined water and air valves through the opening or hand hole with which the casings of dry pipe valves are usually provided. This slotted bearing also provides for readily assembling the parts.

In these dry pipe valves it is highly desirable that when the valves are closed and are functioning in their usual way the pivotal axis of the water valve should remain stationary so that during the opening movement of the water valve it will turn about a fixed axis.

The open slot illustrated in my above-mentioned patent, however, will permit the pivotal shaft of the water valve to have a lateral movement even when the valves are closed.

It is the object of my present invention to provide an improved form of bearing for the water valve which will prevent the pivotal shaft from having any lateral movement while they are swinging into open position and will only permit such lateral movement and removal of the valves when the valves are fully opened. With my invention, therefore, the pivotal axis of the valve will be positively held in its correct position while the valves are functioning but after the valves are fully opened then the pivotal shaft may be removed from the bearing if it is desired to remove the valves from the casing for repairs or any other reason.

In order to give an understanding of the invention I have illustrated in the drawings a selected embodiment thereof which will now be described after which the novel features will be pointed out in the appended claims.

Figure 1:
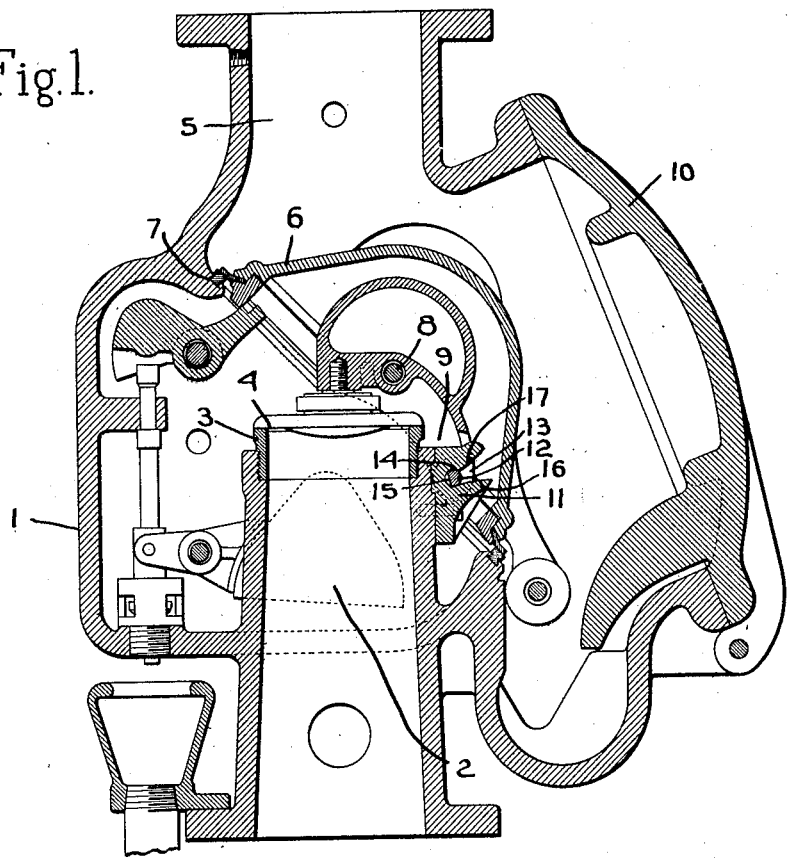
Fig. 1 is a sectional view through a dry pipe valve embodying my invention showing the valve closed.

In the drawings 1 indicates the casing of the dry pipe valve which has the usual inlet 2 terminating in the valve seat 3 on which the water valve 4 is seated and also having the outlet 5 leading to the system. The air valve is indicated at 6 and it seats on a valve seat 7 all as usual in dry pipe valves.

In the present construction the air valve and water valve are pivoted together as shown at 8 and the water valve has an arm 9 extending therefrom which is pivotally connected to the casing. The casing is provided with an opening that is normally closed by a removable closure 10, said closure being situated opposite the air and water valves so that when it is removed access may be had to said valves and the latter may be removed from the casing or replaced in the casing through said opening.

The parts thus far described are or may be all as usual in dry pipe valves of this type and form no part of my present invention which relates to the construction of the pivotal connection between the arm 9 of the water valve and the casing. The casing is provided with a bearing member 11 having a circular seat 14 in which is received a pivotal pin or shaft 12 that is rigid with the arm 9, the latter preferably being a forked arm which embraces the bearing member 11 and the shaft 12 extending from one arm to the other of the fork. The bearing member 11 is provided with the slot 13 leading to the seat 14 and through which the shaft may be removed. The end of the slot adjacent the seat, however, is narrower than the diameter of the pivotal shaft 12 so that when the shaft is in the seat as shown in Fig 1 it cannot be removed laterally through the slot 13.

Figure 2:
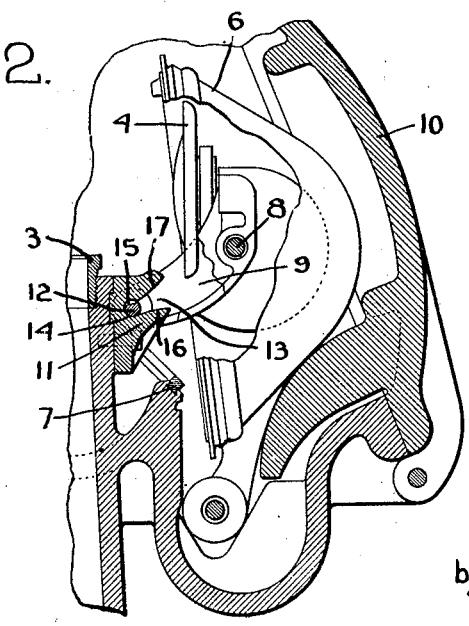
Fig. 2 is a partial sectional view illustrating the valves in open position and in position to be removed from the bearing.

In order to permit the removal of the pivotal shaft from the bearing when the valve is open I propose to slab off the shaft on one side as shown at 15 thereby reducing its thickness in one direction to that of the width of the slot 13 at its narrowest part. The slabbed off part 15 of the pin is so positioned that when the valve is closed as shown in Fig. 1 the slabbed off part stands on the inner face of the pin away from the slot 13 and opposite thereto while when the valve is opened as shown in Fig. 2 this slabbed off part stands on the upper side of the pin and parallel to the upper edge of the slot. When in this position the pivotal pin may be withdrawn laterally from the bearing through the slot 13 but when the valve is closed as shown in Fig. 1 the pivotal shaft is locked in the bearing and cannot be removed laterally therefrom. The slot 13 is preferably so disposed that the lower wall 16 thereof has a tangential relation with the circular wall of the seat 14 while the upper wall 17 of the slot intersects the circular seat 14 at a point below the top thereof.

By means of my improvements the pivotal shaft 12 is positively retained in its proper position while the valves are closed and during the opening movement thereof and can only be removed from this bearing when the valve are fully opened.

I claim:

1. In a dry pipe valve, the combination with a casing having a bearing member provided with a cylindrical bearing portion and an open ended slot leading to said bearing portion, of a valve structure provided with a pivotal shaft journalled in said bearing, said shaft being flattened on the side which is opposite the slot when the valve is closed and the diametrical dimension of said shaft from the flat face to the opposite face being less than the width of the slot at the bearing, whereby when the valve is opened the pivotal shaft may be removed from the bearing by a lateral movement with respect to the axis of the shaft.

2. In a dry pipe valve, the combination with a casing having a bearing, of a water valve having an arm provided with a shaft journalled in said bearing, and an air valve connected to the water valve, said bearing having an open slot leading thereto which is of less width than the diameter of the shaft, and the latter being slabbed off on one side sufficiently to permit its being removed through said slot when the valves are fully opened.

3. In a dry pipe valve, the combination with a casing having a bearing provided with an open slot leading thereto, of a water valve having an arm provided with a shaft journalled in said bearing, and an air valve connected to the water valve, the diameter of the portion of the shaft occupying said bearing being greater in one direction than the width of the slot, and in another direction being of a dimension to pass through the slot, said two diameters being relatively positioned with respect to the valves and the slot so as to permit said shaft to be removed through the slot when the valves are fully opened.

In testimony whereof, I have signed my name to this specification.

EZRA E. CLARK.